US012798172B2

(12) United States Patent
Boztepe

(10) Patent No.: US 12,798,172 B2
(45) Date of Patent: Nov. 17, 2026

(54) RESISTIVE FILM HEATER, COMPOSITE MATERIAL PROCESSING APPARATUS AND METHOD, AND THERMOFORMING SYSTEM AND METHOD

(71) Applicant: The Boeing Company, Arlington, VA (US)

(72) Inventor: Sinan Boztepe, Gdansk (PL)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/664,605

(22) Filed: May 15, 2024

(65) Prior Publication Data

US 2025/0353241 A1 Nov. 20, 2025

(51) Int. Cl.

| | |
|---|---|
| ***B29C 51/42*** | (2006.01) |
| ***B29C 35/02*** | (2006.01) |
| ***B29C 51/18*** | (2006.01) |
| ***B29C 51/46*** | (2006.01) |
| ***H05B 1/02*** | (2006.01) |
| ***H05B 3/14*** | (2006.01) |

(52) U.S. Cl.

CPC ............ *B29C 51/428* (2013.01); *B29C 35/02* (2013.01); *B29C 35/0288* (2013.01); *B29C 51/18* (2013.01); *B29C 51/46* (2013.01); *H05B 1/023* (2013.01); *H05B 3/145* (2013.01); *H05B 3/146* (2013.01); *B29C 2035/0211* (2013.01); *H05B 2203/013* (2013.01); *H05B 2203/016* (2013.01)

(58) Field of Classification Search

CPC ......... B29C 35/02; B29C 51/46; B29C 33/02; B29C 35/0288; B29C 51/428; B29C 51/18; B29C 65/02; B29C 2035/0211; H05B 1/023; H05B 3/145; H05B 3/146; H05B 3/34; H05B 2203/016; H05B 2203/013; H05B 2203/017; H05B 2214/04

See application file for complete search history.

(56) References Cited

U.S. PATENT DOCUMENTS

| | | | | |
|---|---|---|---|---|
| 11,438,973 | B2 | 9/2022 | Kessler et al. | |
| 2004/0040952 | A1 | 3/2004 | Suda et al. | |
| 2007/0295933 | A1 | 12/2007 | Kanba et al. | |
| 2008/0044603 | A1* | 2/2008 | Hutchinson ............ | B65D 51/20 264/325 |
| 2014/0021195 | A1* | 1/2014 | Kim ......................... | H05B 3/84 219/553 |

(Continued)

FOREIGN PATENT DOCUMENTS

| | | |
|---|---|---|
| CN | 113696513 A | 11/2021 |
| CN | 116489832 A | 7/2023 |

(Continued)

OTHER PUBLICATIONS

Kim et al: "Heating Characteristics of Films Prepared with Polymer-Graphite Composites," International Journal of Polymer Science, vol. 2019 (Aug. 19, 2019).

(Continued)

*Primary Examiner* — Monica A Huson
(74) *Attorney, Agent, or Firm* — Walters & Wasylyna LLC

(57) ABSTRACT

A resistive film heater includes: a resistive heating layer comprising lignin-based electrically conductive carbonaceous materials; and electrical terminals attached to the resistive heating layer for supplying electrical current therethrough.

20 Claims, 8 Drawing Sheets

(56) References Cited

U.S. PATENT DOCUMENTS

| | | | | |
|---|---|---|---|---|
| 2020/0331214 | A1* | 10/2020 | Vlavianos | B29C 51/36 |
| 2021/0061663 | A1 | 3/2021 | Carlsson | |

FOREIGN PATENT DOCUMENTS

| | | | |
|---|---|---|---|
| CN | 116749553 | A | 9/2023 |
| EP | 0926925 | A1 | 6/1999 |
| EP | 3691408 | A1 | 8/2020 |
| EP | 3 809 600 | | 4/2021 |
| FR | 2691400 | A1 | 11/1993 |
| WO | WO 2013/190252 | | 12/2013 |

OTHER PUBLICATIONS

Li et al: "Consolidation of aerospace-grade high-temperature thermoplastic carbon fiber composites via nano-engineered electrothermal heating," Composites Part B, vol. 262 (May 22, 2023).

Vertuccio et al: "Effective de-icing using graphene-based flexible heater," Composites Part B, vol. 162, pp. 600-610 (Jan. 8, 2019).

Luo et al: "Fabrication of Lignin-Based Nano Carbon Film Copper Foil Composite with Enhanced Thermal Conductivity," Nanomaterials (Nov. 25, 2019).

Suzuki et al: "Electrically conducting films prepared from graphite and lignin in pure water," Frontiers in Bioengineering and Biotechnology (Nov. 8, 2022).

Yao et al: "Recent advances in lignin-based carbon materials and their applications: A review," International Journal of Biological Macromolecules, vol. 223, pp. 980-1014 (Nov. 12, 2022).

Haanappel et al: "Formability analyses of uni-directional and textile reinforced thermoplastics," Composites: Part A, vol. 56, pp. 80-92 (Sep. 24, 2013).

Xu et al: "In-situ curing of glass fiber reinforced polymer composites via resistive heating of carbon nanotube films," Composite Science and Technology, vol. 149, pp. 20-27 (Jun. 3, 2017).

Dominik Durr: "Simulation of the thermoforming process of UD fiber-reinforced thermoplastic tape laminates," KIT Scientific Publishing (Oct. 11, 2019).

Lee et al: "Advanced carbon fiber composite out-of-autoclave laminate manufacture via nanostructured out-of-oven conductive curing," Composites Science and Technology, vol. 166, pp. 150-159 (Feb. 26, 2018).

Janas et al: "Rapid electrothermal response of high-temperature carbon nanotube film heaters," SciVerse ScienceDirect, Carbon, vol. 59, pp. 457-463 (Mar. 28, 2013).

European Patent Office: "The Partial European Search Report," App. No. 25168256.3 (Dec. 2, 2025).

European Patent Office: Extended European Search Report, App. No. 25168256.3 (Apr. 1, 2026).

* cited by examiner

RESISTIVE FILM HEATER, COMPOSITE MATERIAL PROCESSING APPARATUS AND METHOD, AND THERMOFORMING SYSTEM AND METHOD

FIELD

The present application relates to the fields of resistive film heaters, composite material processing apparatus and methods, and thermoforming systems and methods.

BACKGROUND

Carbon nanotubes, known for their exceptional electrical conductivity and thermal properties, have emerged as a material in the fabrication of resistive film heaters. The utilization of carbon nanotubes in resistive film heaters capitalizes on their combination of high electrical conductivity and excellent thermal stability. However, the reliance on fossil-based materials for the production of carbon nanotubes presents significant environmental and sustainability concerns. The extraction and processing of fossil fuels, as well as the carbon nanotube manufacturing process itself, contribute to carbon emissions and environmental degradation. Furthermore, the finite nature of fossil resources prompts the need for more sustainable alternatives that can meet the growing demand for resistive film heaters without exacerbating ecological impacts.

Another challenge associated with conventional carbon nanotube-based resistive film heaters is the cost and complexity of production. The synthesis of carbon nanotubes is often intricate and resource-intensive, leading to higher costs that can limit their application in cost-sensitive industries. Additionally, integrating carbon nanotubes into a functional film heater requires specialized techniques to ensure uniform distribution and optimal electrical and thermal performance, adding further to the production challenges.

Accordingly, those skilled in the art continue with research and development in the field of resistive film heaters, composite material processing apparatus and methods, and thermoforming systems and methods.

SUMMARY

In one embodiment, the present description relates to a resistive film heater.

An exemplary resistive film heater includes: a resistive heating layer comprising lignin-based electrically conductive carbonaceous materials; and electrical terminals attached to the resistive heating layer for supplying electrical current therethrough.

In another embodiment, the present description relates to a composite material processing apparatus.

An exemplary composite material processing apparatus includes: a resistive film heater for providing heat to a composite material, the resistive film heater, comprising a resistive heating layer comprising lignin-based electrically conductive carbonaceous materials, and electrical terminals attached to the resistive heating layer; a vacuum bag arrangement for encasing the composite material and the resistive film heater and for maintaining a vacuum environment therein; and an electrical interface for supplying electrical current through the electrical terminals of the resistive film heater.

In another embodiment, the present description relates to a method for processing a composite material.

An exemplary composite material processing method includes: encasing the composite material and the resistive film heater within the vacuum bag arrangement; evacuating air from the vacuum bag arrangement to form a vacuum environment around the composite material and the resistive film heater; and passing an electrical current through the electrical interface to the electrical terminals of the resistive film heater to heat the composite material.

In yet another embodiment, the present description relates to a thermoforming system for shaping a thermoplastic material.

An exemplary thermoforming system includes: a male die and a female die, at least one of which is equipped with a resistive film heater for heating of a surface thereof, the resistive film heater comprising a resistive heating layer comprising lignin-based electrically conductive carbonaceous materials, and electrical terminals attached to the resistive heating layer; and a power source connected to the electrical terminals attached to the resistive heating layer.

In yet another embodiment, the present description relates to a method for thermoforming.

An exemplary thermoforming method includes: heating at least one of the male die and female die using the resistive film heater; placing a thermoplastic material between the male die and the female die; applying pressure to mold the thermoplastic material into a desired shape; and cooling the molded thermoplastic material to solidify the shape.

Other embodiments of the disclosed systems and methods will become apparent from the following detailed description, the accompanying drawings and the appended claims.

DETAILED DESCRIPTION

Figure 1:
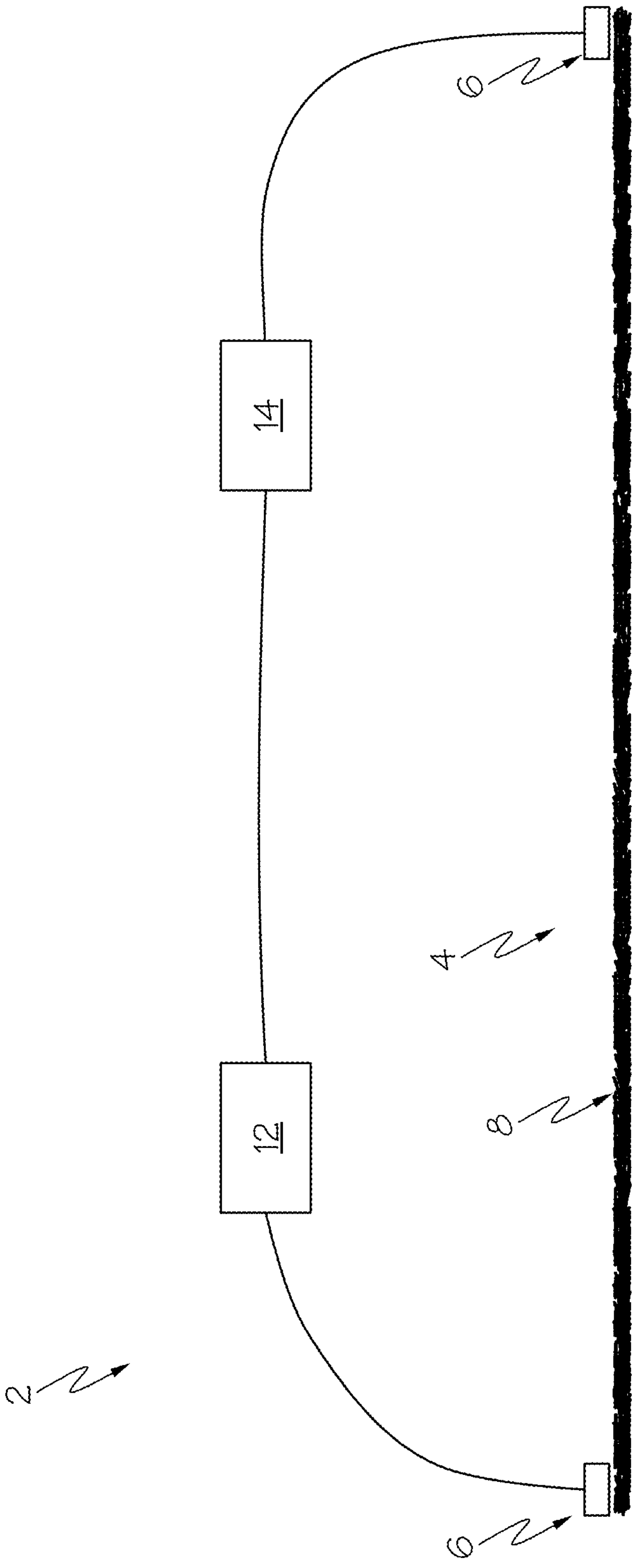
FIG. 1 illustrates a resistive film heater of the present description comprising a resistive heating layer with lignin-based electrically conductive carbonaceous materials and electrical terminals for current supply.

The present description pertains to a resistive film heater having a structure that incorporates a resistive heating layer comprised of lignin-based electrically conductive carbonaceous materials. This resistive heating layer converts electrical energy passing therethrough into heat. Electrical terminals are affixed to the resistive heating layer, enabling the passage of electrical current through the material, thus facilitating the heating process. The use of lignin-based electrically conductive carbonaceous materials enhances the performance of the resistive film heater and improves the sustainability aspect of the technology.

Lignin is a natural organic polymer that is found in the cell walls of plants. It acts as a binder and a structural support for the plant fibers, giving them strength and rigidity. Lignin is the second most abundant biopolymer on Earth, after cellulose, and accounts for much of the organic carbon in the biosphere. Lignin is also a renewable and abundant source of raw material for various industrial applications. In the context of the present description, lignin is used as a feedstock for producing electrically conductive carbonaceous materials that can be used as resistive heating layers in film heaters. By using lignin as a carbon source, the present description aims to reduce the environmental impact and the cost of the resistive film heater technology, while enhancing its performance.

Lignin is a sustainable carbon precursor for several reasons. First, lignin is a by-product of the pulp and paper industry, which processes large amounts of wood every year. Lignin is usually burned or discarded as waste, resulting in environmental pollution and wasted resources. By using lignin as a raw material for producing carbonaceous materials, the present description can utilize this abundant and renewable biomass resource and reduce waste generation. Second, lignin is derived from plants, which capture and store atmospheric carbon dioxide through photosynthesis. Therefore, using lignin as a carbon source can reduce the greenhouse gas emissions associated with fossil fuels, which are commonly used as carbon precursors. Third, lignin has a low oxygen content compared to other biopolymers, such as cellulose and starch. This means that lignin requires less energy for carbonization, which is the process of heating the biomass in the absence of oxygen to produce carbonaceous materials. Therefore, using lignin as a feedstock can lower the energy consumption and the cost of the carbonization process.

Lignin is a biopolymer that has a high carbon content and a low oxygen content compared to other biopolymers. Lignin also has a complex and irregular structure that contains many aromatic rings. The high carbon content and aromatic structure of lignin make it an attractive precursor for producing electrically conductive carbonaceous materials. Due to its high carbon content, lignin has a high carbon yield after carbonization. This means that less lignin is needed to produce a given amount of carbonaceous material, compared to other biopolymers. Lignin also has a high degree of aromaticity, which means that it contains a large number of aromatic rings in its structure. This facilitates the formation of graphitic structures, which are the basis of many carbonaceous materials, such as graphite, graphene, and carbon nanotubes. Therefore, using lignin as a precursor can facilitate the formation of carbonaceous structures having high electrical conductivity properties ideal for use in a resistive heating layer.

Lignin-based electrically conductive carbonaceous materials are carbonaceous materials that are derived from lignin, a renewable and abundant biomass resource, and have high electrical conductivity exceeding $10^2$ S/m. Some examples of lignin-based electrically conductive carbonaceous materials are lignin-based graphite and lignin-based graphene.

The fabrication of lignin-based electrically conductive carbonaceous materials involves a carbonization step, which is the process of heating lignin in the absence of oxygen to produce a carbon-rich material. The carbonization step can be performed at different temperatures and durations, depending on the desired properties of the final product. The carbonization step can also be combined with other treatments to modify the structure, morphology, and functionality of the carbonaceous material. The carbonization step can result in various types of carbonaceous materials depending on the lignin source, the carbonization conditions, and the post-treatment methods. An exemplary fabrication process of lignin-based electrically conductive carbonaceous materials can follow several steps. Starting with a lignin source, the material can be dissolved or dispersed in an appropriate solvent, which can be water or a mixture involving other solvents for better solubility and dispersion properties. Additional components, such as binders, may be added to improve the stability and uniformity of the lignin solution or dispersion. Then, the lignin-based composition is deposited onto a substrate using techniques like drop-casting, spin coating, or dip coating. The deposited lignin is then subjected to a carbonization process, which typically involves heating in an inert atmosphere to temperatures typically ranging from 500° C. to 1100° C. This process decomposes the lignin into a carbon-rich structure. The specific conditions of the carbonization process, such as temperature, duration, and atmospheric composition, play a role in defining the properties of the final carbonaceous material. After carbonization, the material may undergo various post-treatment processes to enhance its electrical conductivity, structural integrity, or specific surface functionalities. This could include activation processes, chemical or physical treatments to increase surface area, or further heat treatments at different conditions.

One of the remarkable properties of the lignin-based electrically conductive carbonaceous materials is their high electrical conductivity. These lignin-based materials can exhibit electrical conductivities exceeding 10^2 S/m. Moreover, these lignin-based materials can achieve electrical conductivities surpassing 10^3, 10^4, 10^5, or even 10^6 S/m, which are in the typical ranges for graphite or graphene. The electrical conductivity depends on several factors, such as the degree of graphitization, the crystallite size, the defect density, the porosity, and any surface functional groups. Among the different types of lignin-based electrically conductive carbonaceous materials, the lignin-based graphite and the lignin-based graphene show the highest electrical conductivities, as they have the most graphitic structures. The lignin-based graphite typically have electrical conductivities in the range of 10^2 to 10^5 S/m, depending on the carbonization temperature and the lignin source. The lignin-based graphene, on the other hand, can achieve electrical conductivities exceeding 10^5 S/m, or even exceeding 10^6 S/m, as they have thinner and more uniform structures with fewer defects and higher surface areas.

The morphology of the lignin-based electrically conductive carbonaceous materials can vary depending on the fabrication process and the post-treatment methods. However, a common feature of these materials is that they tend to form flake-like structures with various sizes, shapes, and thicknesses. The flake morphology may be attributed to the inherent tendency of lignin to form aggregates or clusters during the carbonization process. The flake shape could be irregular, circular, hexagonal, or other geometrical forms, depending on the graphitization and the crystalline orientation. The flake thickness can also vary. Besides the flake-like morphology, the lignin-based electrically conductive carbonaceous materials can also exhibit other morphologies, such as fibers, tubes, spheres, or porous structures. These morphologies can be achieved by using different solvents, substrates, or templates during the fabrication process, or by applying additional treatments.

The flake size can range from nanometers to millimeters, depending on the carbonization temperature, the lignin source, and the solvent used. Increasing a flake size is advantageous for increasing an electrical conductivity of the resulting resistive heating layer comprised of the lignin-based electrically conductive carbonaceous materials. In an aspect, the flakes of electrically conductive carbonaceous materials have an average size of at least average size of at least 1 $\mu m^2$, preferably at least 10 $\mu m^2$, preferably at least 100 $\mu m^2$, preferably at least 1000 $\mu m^2$, preferably at least 10,000 $\mu m^2$, preferably at least 100,000 $\mu m^2$, preferably at least 1 $mm^2$. The flake size can have a significant effect on the electrical conductivity of a resistive heating layer formed from the lignin-based electrically conductive carbonaceous materials. Larger flakes can provide more effective pathways for charge transport, as they have fewer inter-flake contacts that can introduce resistance and scattering. Moreover, larger flakes can reduce the number of defects and increase the crystallite size, which can enhance the graphitization degree and the intrinsic conductivity. Therefore, increasing the flake size can improve the electrical conductivity of the lignin-based electrically conductive carbonaceous materials, as well as the films made from them.

One of the applications of the lignin-based electrically conductive carbonaceous materials is to fabricate thin films that can be used for resistive heating. The films of lignin-based electrically conductive carbonaceous materials can be prepared by different methods, such as drop-casting, spin-coating, spray-coating, or blade-coating. The films can be deposited on various substrates, depending on the desired properties and applications. The morphology and the electrical conductivity of the films can be tuned by varying the carbonization temperature, the lignin source, the solvent type, or the post-treatment methods.

One way to prepare films of lignin-based electrically conductive carbonaceous materials is to blend them with a polymer matrix. The polymer matrix can provide mechanical support, flexibility, and adhesion for the lignin-based electrically conductive carbonaceous materials. The polymer matrix can also improve the stability and durability of the film under different environmental conditions, such as humidity, temperature, or chemical exposure. The polymer matrix can be chosen from various types of polymers, such as thermoplastics, thermosets, elastomers, or biopolymers. Some examples of exemplary polymers are polypropylene (PP), polybutadiene (PB), polyvinyl alcohol (PVA), high density polyethylene (HDPE), and low-density polyethylene (LDPE) such as linear low-density polyethylene (LLDPE). Preferably polymers may have a glass transition temperature at or below room temperature. The polymer matrix can be mixed with the lignin-based electrically conductive carbonaceous materials in different ratios, depending on the desired characteristics of the film. The mixing process can be performed by using a solvent, a melt, or a dispersion method. The weight ratio of polymer matrix/lignin-based electrically conductive carbonaceous materials may be, for example, in a range of 1:1 to 1:10, in order to provide enough flexibility, but also maintain a sufficiently high electrical and thermal conductivity. However, the selected weight ratio may be affected by the type of polymer to be used. The film of lignin-based electrically conductive carbonaceous materials with a polymer matrix can be formed by the same methods as the film without a polymer matrix, such as drop-casting, spin-coating, spray-coating, or blade-coating. Alternatively, the film can be prepared by a molding, extrusion, or compression technique. The film of lignin-based electrically conductive carbonaceous materials with a polymer matrix can have various thicknesses, depending on the application. In an aspect, the film can have various thickness such as 1 nm to 10 nm, or 10 nm to 100 nm, or 100 nm to 1 μm, or 1 μm to 10 μm, or 10 μm to 100 μm, or 100 μm to 1 mm.

Another way to prepare films of lignin-based electrically conductive carbonaceous materials is to make them self-standing, without the need for a polymer matrix. The self-standing films of lignin-based electrically conductive carbonaceous materials can be obtained by directly carbonizing a lignin film. The self-standing films of lignin-based electrically conductive carbonaceous materials can have high mechanical strength, flexibility, and electrical conductivity. The self-standing films of lignin-based electrically conductive carbonaceous materials can also be cut, folded, or rolled into different shapes and sizes, depending on the application. These self-standing films of lignin-based electrically conductive carbonaceous materials can be used as resistive heating elements. In an aspect, the film can have various thickness such as 1 nm to 10 nm, or 10 nm to 100 nm, or 100 nm to 1 μm, or 1 μm to 10 μm, or 10 μm to 100 μm, or 100 μm to 1 mm.

The resistive film heater may include a substrate. A substrate is a layer that supports the film of lignin-based electrically conductive carbonaceous materials. The substrate can be made of various materials, such as paper, plastic, metal, glass, ceramic, or textile. The substrate can have different shapes, sizes, and surface properties, depending on the application. The substrate can also be flexible or rigid, transparent or opaque, smooth or rough, porous or nonporous, or flat or curved. The film of lignin-based electrically conductive carbonaceous materials can be deposited on a substrate by using any of the methods described above, such as drop-casting, spin-coating, spray-coating, or blade-coating. The substrate can be removed or may form a part of the final product, depending on the application. For example, the substrate can be removed if the film is self-standing or attached to another material. The substrate can form a part of the final product if the film is integrated with the substrate or functionalized by the substrate. The substrate can be functionalized to provide additional benefits or functions for the heating system. For example, the substrate may be thermally conductive to conduct heat produced by the film, or may be thermally insulative to prevent heat from passing therethrough. The substrate may also be adhesive to attach the film to another surface.

A resistive heating layer may be disposed on the substrate. The resistive heating layer is the layer that generates heat when an electric current passes through it. The resistive heating layer is composed of the film of lignin-based electrically conductive carbonaceous materials, either with or without a polymer matrix, as described above. Alternatively, the resistive layer can include additional materials or layers that enhance the heating performance, durability, or functionality of the film. The resistive layer can have various thicknesses, depending on the application. In an aspect, the film can have various thickness such as 1 nm to 10 nm, or 10 nm to 100 nm, or 100 nm to 1 μm, or 1 μm to 10 μm, or 10 μm to 100 μm, or 100 μm to 1 mm.

Electrical terminals are the components that connect the resistive heating layer to the power supply and complete the electric circuit. The electrical terminals can be made of any conductive material, such as metal, carbon, or graphene. In an aspect, the electrical terminals are comprised of at least one of copper, copper alloy, aluminum, and aluminum alloy, which have high electrical conductivity and low electrical resistance, which can reduce the power loss and increase the efficiency of the heating system. The electrical terminals can have various shapes, sizes, and arrangements, depending on the application. The electrical terminals can be attached to the resistive heating layer by using any of the methods known in the art. The electrical terminals can also include additional features to facilitate the control and monitoring of the heating process.

The resistive film heater may include a power supply. A power supply is the component that provides the electric current to the resistive heating layer and enables the heating process. The power supply can also include additional components, such as transformers, converters, regulators, switches, sensors, or controllers, to adjust the output parameters and optimize the heating performance. The power supply can be connected to the electrical terminals by using any of the methods known in the art. The power supply can also include features to facilitate the safety and reliability of the heating system.

The resistive film heater may include a temperature controller. A temperature controller is the component that regulates the temperature of the resistive layer and ensures the desired heating profile. The temperature controller can include sensors, such as thermocouples, thermistors, or infrared cameras, to measure the temperature of the resistive layer or the composite material. The temperature controller can also include feedback mechanisms to adjust the electric current supplied by the power supply and maintain the target temperature. The temperature controller can be connected to the electrical terminals, the power supply, or both, by using any of the methods known in the art. The temperature controller can also include features to facilitate the communication and integration with other components of the heating system or the composite material processing apparatus.

FIG. 1 illustrates an exemplary resistive film heater 2 according to one aspect of the present description, including a standalone resistive heating layer 4 and electrical terminals 6 affixed to the resistive heating layer. The resistive heating layer 4 is comprised of lignin-based electrically conductive carbonaceous materials 8. A power supply 12 is connected to the electrical terminals, and a temperature controller 14 is connected to the electrical terminals, the power supply, or both.

Figure 2:
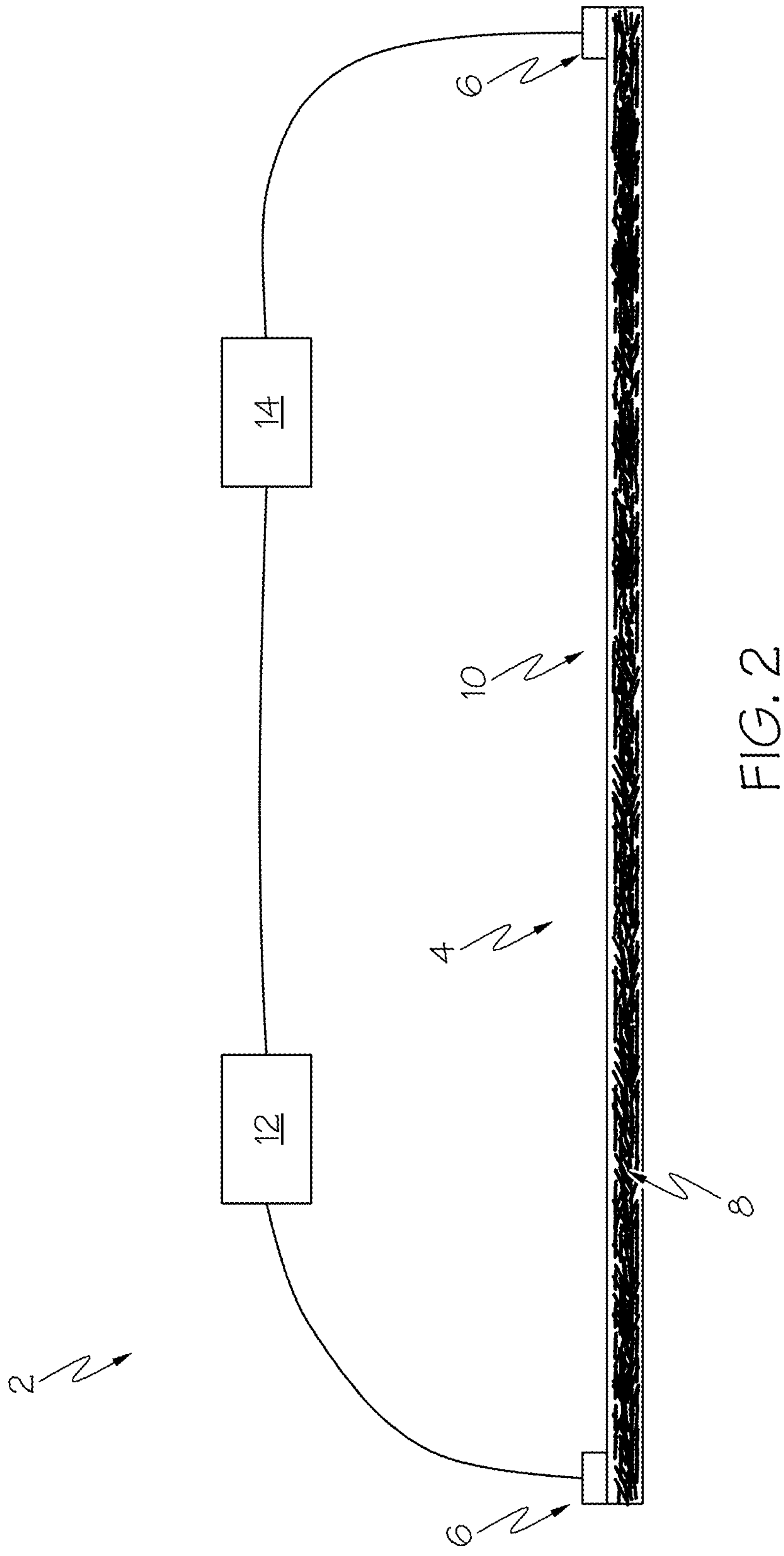
FIG. 2 illustrates a resistive film heater of the present description including a resistive heating layer with a polymer matrix, lignin-based carbonaceous materials, and attached electrical terminals.

FIG. 2 illustrates an exemplary resistive film heater 2 according to another aspect of the present description, including a resistive heating layer 4 and electrical terminals 6 affixed to the resistive heating layer. The resistive heating layer 4 is comprised of lignin-based electrically conductive carbonaceous materials 8 and a polymer matrix 10. A power supply 12 is connected to the electrical terminals, and a temperature controller is connected to the electrical terminals, the power supply, or both.

The present description also pertains to a composite material processing device that includes the resistive film heater, a vacuum bag system for covering the composite material and the resistive film heater and for keeping a vacuum state inside, and an electrical connection for providing electrical current to the electrical terminals of the resistive film heater. The composite material processing device can be used to heat and cure the composite material in a controlled and efficient manner, using the resistive film heater as a direct and conformal heating source.

The composite material to be processed may be, for example, a combination of fibers and resin that can be cured by heat and pressure. The fibers can be carbon, glass, aramid, or other materials that provide strength and stiffness to the composite. The resin can be epoxy, polyester, vinyl ester, or other thermosetting polymers that bind the fibers together and form a solid matrix. The composite material can have different shapes, sizes, and orientations of the fibers and resin, depending on the desired properties and applications of the final product. The composite material can also be a stackup of multiple plies or layers of fibers and resin that are interleaved or laminated to form a single structure with enhanced properties. The stackup can have different types of fibers and resins in each layer, or the same type with different orientations or thicknesses. The stackup could also include other materials, such as metal foils, honeycomb cores, or foam cores, to provide additional strength, stiffness, or insulation. The resistive film heater can be applied to the surface of the stackup or embedded within the layers to provide uniform heating and curing of the composite material. The composite material can be used for aerospace, automotive, marine, or other industrial purposes.

The vacuum bag system is a component of the composite material processing device that covers the composite material and the resistive film heater and creates a vacuum inside. The vacuum bag system may include, for example, a vacuum bag, a vacuum port, and a vacuum pump. The vacuum bag can be a flexible and durable sheet of plastic or rubber that can conform to the shape of the composite material and the resistive film heater. The vacuum port is typically a small opening on the vacuum bag that connects to a vacuum hose. The vacuum pump is a device that creates a vacuum by sucking out the air from the vacuum bag through the vacuum hose. The vacuum bag system can provide several benefits for the composite material processing, such as reducing the air bubbles and voids in the resin, improving the compaction and consolidation of the fibers, enhancing the adhesion and bonding of the layers, and preventing the oxidation and contamination of the composite material.

The composite material processing device may include an electrical interface. An electrical interface is a component of the composite material processing device that connects the resistive film heater to a power source. The electrical interface may include, for example, an electrical contact, a temperature controller, and a sensor. The electrical contact is typically a metal or conductive material that attaches to the terminals of the resistive film heater and transfers electricity from the power source to the heater. The electrical contact can be a clamp, a clip, a wire, or a plug, depending on the design and configuration of the resistive film heater. The temperature controller is a device that regulates the voltage and current of the electricity that flows to the resistive film heater. The temperature controller can also set the desired temperature and time of the heating and curing process, and adjust them according to the feedback from the sensor. The sensor is a device that measures the temperature of the resistive film heater and the composite material and sends the data to the controller. The sensor can be a thermocouple, a thermistor, a pyrometer, or an infrared camera, depending on the accuracy and resolution required. The electrical interface can ensure that the composite material is heated and cured at the optimal conditions and achieve the best quality and performance.

The composite material processing device may include a breather material, which may be positioned adjacent to the composite material. A breather material is a component of the composite material processing device that allows the excess gas and resin to escape from the vacuum bag system during the heating and curing process. The breather material can be a porous and absorbent fabric or paper that is placed between the vacuum bag and the perforated film. The breather material can prevent the vacuum bag from sticking to the composite material and the resistive film heater, and also provide a uniform pressure distribution across the composite material. The breather material can also collect the excess resin that flows out of the composite material and prevent it from clogging the vacuum hose or damaging the vacuum pump. The breather material can improve the quality and consistency of the composite material by reducing the defects and irregularities caused by the trapped gas and resin.

The composite material processing device may include a perforated film. A perforated film is a component of the composite material processing device that controls the resin flow and distribution within the composite material during the heating and curing process. The perforated film is typically a thin and flexible plastic film with small holes or slits that allow the excess resin to be squeezed out of the composite material and into the breather material. The perforated film can be placed between the composite material and the resistive film heater, or between the composite material and the vacuum bag, depending on the desired resin content and pressure gradient. The perforated film can also act as a release film that prevents the composite material from adhering to the resistive film heater or the vacuum bag. The perforated film can influence the quality and performance of the composite material by affecting the resin-to-fiber ratio, the void content, the surface finish, and the dimensional stability.

The composite material processing device may include an electrical isolation layer. An electrical isolation layer is a component of the composite material processing device that prevents the electrical current from flowing through the composite material and causing damage or interference. The electrical isolation layer can be a non-conductive and non-porous material, such as a plastic film, which is placed between the resistive film heater and the composite material. The electrical isolation layer can also act as a barrier that blocks the excess resin from reaching the resistive film heater and affecting its electrical performance. The electrical isolation layer can ensure the safety and efficiency of the composite material processing device by isolating the electrical circuit from the composite material and the resin.

The composite material processing device may include a thermal isolation layer A thermal isolation material is a component of the composite material processing device that reduces the heat loss and improves the temperature uniformity within the composite material during the heating and curing process. The thermal isolation material can be a low-density and low-conductivity material, such as a foam or a mineral wool, which is placed around the sides, top, and bottom of the composite material. The thermal isolation material can also act as a cushion that protects the composite material from mechanical damage or deformation. The thermal isolation material can enhance the quality and efficiency of the composite material processing device by minimizing the energy consumption and maximizing the heat transfer within the composite material.

Figure 3:
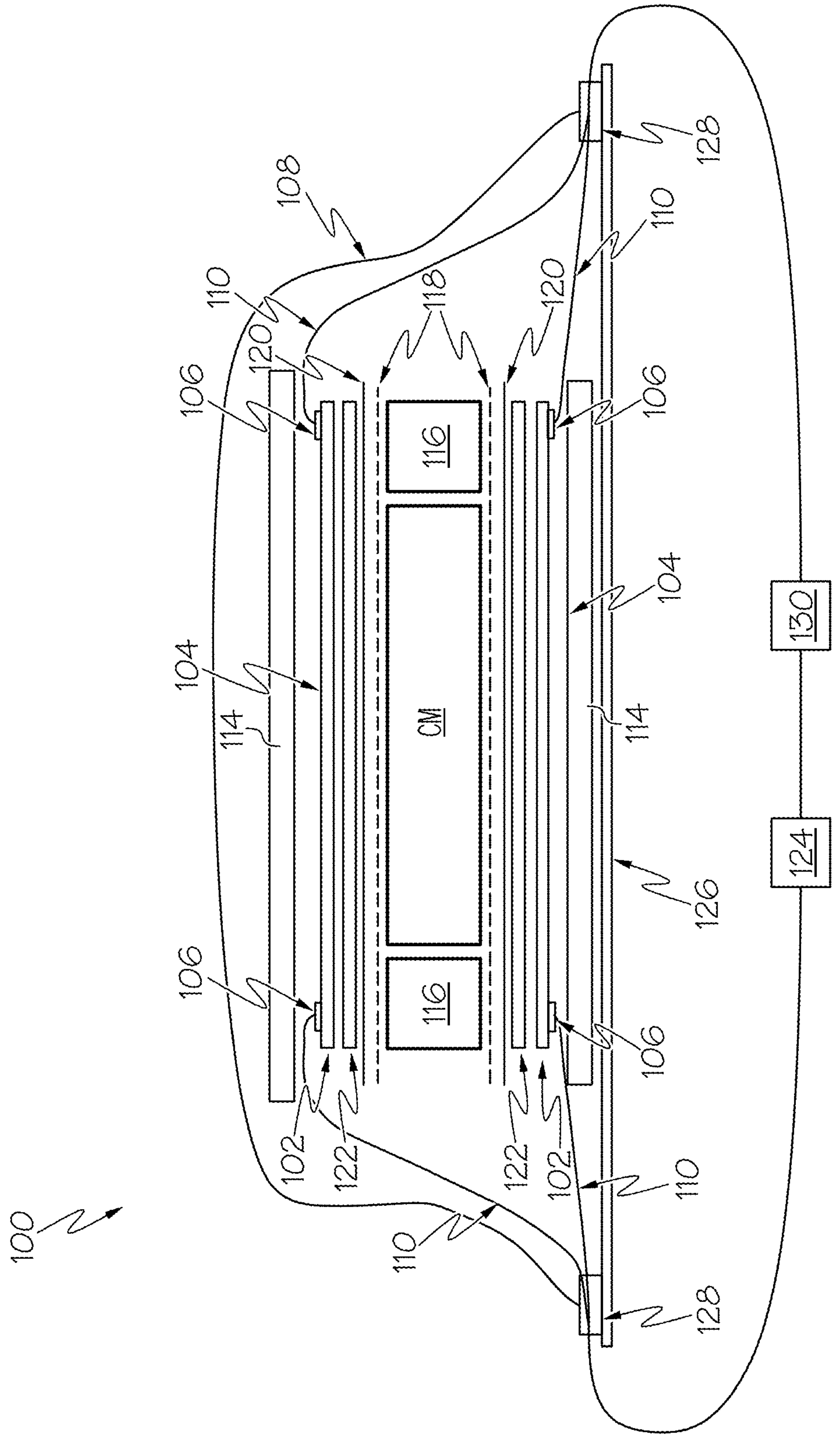
FIG. 3 illustrates a composite material processing apparatus of the present description with a resistive film heater, vacuum bag arrangement, electrical interface, and additional components for composite material processing.

FIG. 3 illustrates an exemplary composite material processing apparatus according to the present description. In particular, the figure depicts an example of a composite material processing apparatus 100 for composite processing of a flat stackup of composite material M. However, laminates or stackups of composite material CM draped on curved surfaces may also be cured and/or consolidated using this method as the resistive film heaters of the present description may be thin and flexible.

As illustrated in FIG. 3, the exemplary composite material processing apparatus 100 for composite processing of a composite material CM includes resistive film heater 102 for providing heat to the composite material CM the resistive film heating comprising a resistive heating layer 104 comprising lignin-based electrically conductive carbonaceous materials and electrical terminal 106 attached to the resistive heating layer. The exemplary composite material processing apparatus 100 further includes a vacuum bag 108 for encasing the composite material CM and the resistive film heater 102 and for maintaining a vacuum environment therein and an electrical interface 110 for supplying electrical current through the electrical terminals 106 of the resistive film heater 102, the electrical interface 110 including electric cables or wires for applying an electrical current. The exemplary composite material processing apparatus 100 further includes a thermal isolation material 114, 116 with low thermal conductivity, a perforated film 118 (for example, a KAPTON® polyimide film), a breather material 120, and an electrical isolation layer 122. The thermal isolation material 114 is positioned adjacent to the resistive film heater 102 on a side opposite of the composite material CM.

The composite material CM may be a stackup of composite material CM, and may be isolated on the sides with the thermal isolation material 114 in order to minimize the heat loss and in-plane temperature gradient in the composite material CM. Similarly, the thermal isolation material 116 is positioned on the top and the bottom of the process setup to minimize heat losses to the environment. Perforated film 118 and breather material 120 are positioned on the top and bottom surfaces of the composite material CM to help void compaction and air evacuation during curing and/or consolidation process of the composite material CM, which are typically applied for composite processing under vacuum in the enclosure formed by the vacuum bag 108.

One or more electrical isolation layers 122 may be positioned between the composite material CM and the resistive film heater 102 in order to remove the resistive film heater 102 easily after each curing and/or consolidation process for reusable purposes. The electrical isolation layers 122 may be, for example, a TEFLON® film, which has a role for efficient heat transfer into thick composites. To reduce thermal contact resistance between the electrical isolation layers 122 and the resistive film heaters 102, a thermal coupling agent may be applied between the film heaters 102 and the electrical isolation layers 122 for an efficient through-thickness heat transfer through the composite material CM.

A power supply 124, such as a direct current (DC) power source, is connected to the electric terminals 106 of the resistive film heaters 102 using electric cables or wires of electrical interface 110, which are attached on both the ends of each resistive film heater 102. The electric terminals 106 may be made of copper (for example, a copper mesh). In case of a high electric contact resistance between the electric terminals 106 and the resistive heating layer 104, a conductive adhesive (for example, a conductive silver adhesive) may be applied between the resistive heating layer 104 and the electric terminals 106. The entire arrangement may be formed on a platform 126 which supports the other components of the composite material processing apparatus 100 and defines the vacuum chamber with the vacuum bag 108. Conductive cables or wires of electrical interface 110 are taken out of the vacuum bag 108 by passing them through the tacky tape material 128, which is typically applied for vacuum bag processes. Conductive cables or wires may be as thin as possible, while also having a smooth surface in order to minimize the risk of having a leak in vacuum bag 108.

The resistive film heater 102, which is comprised of the resistive heating layer 104 comprising lignin-based electrically conductive carbonaceous materials and the electrical terminals 106 attached to the resistive heating layer 104, offers great cost savings in terms of initial capital investment on reusable hardware in comparison to nanomaterial-based reusable heater elements made of CNT or nanographene. The proposed apparatus aims to use the most performant, cost-effective and environmentally friendly lignin-based resistive film heater 102, which may potentially allow using the proposed apparatus for any type of fiber/resin combination existing in the market.

The apparatus 100 uses a resistive film heater 102 having a resistive heating layer 104 made of lignin-based carbonaceous materials. Using the resistive film heater 102 for composite processing enables relatively faster heating, and lower energy consumption during processing. The proposed resistive heating method can be adopted for various processes where resistive film heaters 102 may be placed on one or both the upper and lower sides of a composite material CM so that the heat generated by the resistive film heaters 102 is dissipated by conduction through the thickness of a composite material CM. The resistive heating layer 104 of the resistive film heater 102 may be made of bio-derived lignin-based carbonaceous material, such as graphite or graphene flakes. The resistive heating layer 104 may also be made of a blend of polymer/lignin-based graphite or graphene flakes which can be used for manufacturing of curved parts or complex-shaped parts under vacuum as such a film heater can offer high flexibility.

To regulate the temperature of the resistive film heater 102, a temperature controller 130 may be connected to the electrical terminals 106 of the resistive film heater 102. The temperature controller 130 may adjust the electrical current supplied by the power supply 124. The temperature controller 130 may receive feedback from one or more temperature sensors (not shown). The temperature controller 130 may be programmed to follow a predefined temperature profile or set point for the composite material processing. Alternatively, the temperature controller 130 may allow manual control of the temperature by the user.

It should be understood that the exemplary composite material processing apparatus 100 as shown and described with reference to FIG. 3 is one example and that variations and modifications to the selection and arrangement of components may occur and are included in the scope of the present description.

Figure 4:
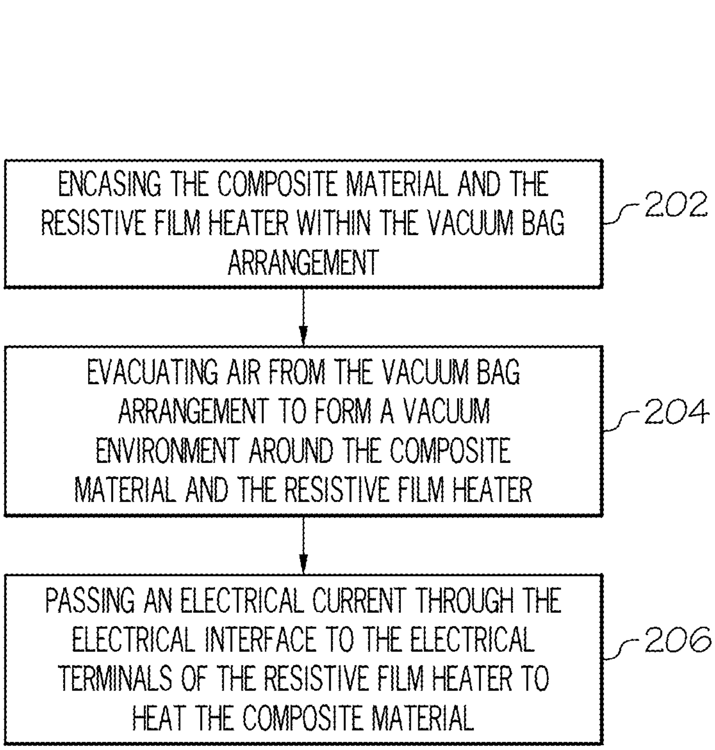
FIG. 4 represents a flow diagram for processing a composite material of the present description.

The present description also pertains to a method for processing a composite material using a composite material processing apparatus, such as the composite material processing apparatus of FIG. 3. The method is described in the flow diagram of FIG. 4. As described in FIG. 4, the method 200 includes: at block 202, encasing the composite material and the resistive film heater within the vacuum bag arrangement; at block 204, evacuating air from the vacuum bag arrangement to form a vacuum environment around the composite material and the resistive film heater; and at block 206, passing an electrical current through the electrical interface to the electrical terminals of the resistive film heater to heat the composite material. The method 200 may further include adjusting the electrical current passed through the electrical interface to control a temperature of the resistive film heater. The method 200 may further include the step of removing the composite material and the resistive film heater from the vacuum bag arrangement after processing of the composite material is complete. The composite material CM may be compacted by the vacuum bag during the heating of the composite material.

Such composite material processing methods are typically used to produce high-performance and lightweight structures that have applications in various industries, such as aerospace, automotive, marine, and sports. Composite materials are composed of two or more distinct phases, such as fibers and matrix, which have different physical and chemical properties. The combination of these phases results in a composite material that has enhanced characteristics, such as strength, stiffness, durability, and corrosion resistance.

One of the challenges in composite material processing is to achieve a uniform and optimal temperature distribution throughout the composite material during the curing or consolidation process. This is important to ensure that the composite material attains the desired mechanical and thermal properties and avoid defects, such as voids, porosity, and resin-rich or resin-poor areas. Conventional heating methods, such as convection ovens, infrared lamps, induction coils, and autoclaves, have limitations in terms of energy efficiency, heating rate, heating uniformity, and flexibility.

The proposed composite material processing method overcomes these limitations by using a resistive film heater that is placed in close proximity with the composite material within a vacuum bag arrangement. The resistive film heater is made of lignin-based electrically conductive carbonaceous materials, such as graphite or graphene, which have high electrical conductivity and thermal conductivity. The resistive film heater can generate heat by Joule effect when an electrical current is passed through it. The heat generated by the resistive film heater is transferred to the composite material by conduction, resulting in a fast and uniform heating of the composite material. The resistive film heater can also be controlled by adjusting the electrical current to regulate the temperature of the composite material according to the desired processing parameters. Furthermore, the resistive film heater is flexible and conformable to the shape of the composite material, allowing for the processing of complex-shaped parts.

The proposed composite material processing method may also include the following additional features or steps: (1) The composite material may be pre-heated before placing it in the vacuum bag arrangement to reduce the heating time and energy consumption of the resistive film heater, (2) The resistive film heater may be covered by a release film or a breather layer to prevent the adhesion of the composite material to the resistive film heater and to allow the escape of volatiles and moisture from the composite material during the heating process, (3) The vacuum bag arrangement may include a vacuum pump, a vacuum hose, a vacuum valve, and a vacuum gauge to monitor and maintain the vacuum level inside the vacuum bag. The vacuum bag arrangement may also include a thermocouple or a temperature sensor to measure the temperature of the composite material and provide feedback to the power source for controlling the electrical current of the resistive film heater. (4) The composite material may be cooled down after the heating process to allow the composite material to solidify and reach the final shape and properties. The cooling process may be performed by natural convection, forced convection, or water quenching.

The present description also pertains to a thermoforming system for shaping a thermoplastic material. The system includes a male die and a female die, at least one of which is equipped with a resistive film heater for heating of a surface thereof. The resistive film heater includes a resistive heating layer comprising lignin-based electrically conductive carbonaceous materials, and electrical terminals attached to the resistive heating layer. A power source connected to the electrical terminals attached to the resistive heating layer.

There are many types of thermoplastic materials that may be suitable for the thermoforming system that uses the resistive film heaters. Thermoplastic materials are polymers that can be softened and reshaped when heated and solidified when cooled. An example of a thermoplastic material is a fiber-reinforced composites, which is a thermoplastic material that includes fibers embedded in a polymer matrix. The fibers provide strength and stiffness to the material, while the polymer matrix provides ductility and shapeability. Fiber-reinforced composites can have various types of fibers, such as glass, carbon, aramid, or natural fibers, and various types of polymers, such as polyethylene, polypropylene, nylon, or epoxy. Fiber-reinforced composites can be shaped by thermoforming using the resistive film heaters described herein. The resistive film heaters can provide fast and uniform heating of the fiber-reinforced composite preforms, which can reduce the cycle time and energy consumption of thermoforming. The resistive film heaters can also allow for better control of the temperature profile and distribution across the preform, which can improve the quality and consistency of the final product.

The male die and the female die are shaped to match the desired geometry of the final product. The male die is the part of the tool that pushes the thermoplastic material into the cavity of the female die. The female die is the part of the tool that forms the outer surface of the product. The male die and the female die may be made of metal, an elastomeric material such as rubber, or a combination thereof. The resistive film heater may be attached to either the male die or the female die, or both, depending on the heating requirements of the thermoforming process. The resistive film heater may conform to the shape and size of the die surface, and may provide uniform heating across the die surface.

The thermoforming system may include an electrical isolation layer. The electrical isolation layer is a layer of insulating material that prevents the resistive film heater from contacting the die surface and causing a short circuit. The electrical isolation layer may also protect the die surface from any damage or wear caused by the resistive film heater. The electrical isolation layer may be made of ceramic, glass, polymer, or composite materials that have high thermal conductivity and low electrical conductivity. The electrical isolation layer may be attached to the resistive film heater, such as by adhesive bonding, mechanical fastening, or lamination. The electrical isolation layer may have the same shape and size as the resistive film heater or may cover only a portion of the resistive film heater, depending on the design and configuration of the thermoforming system. The electrical isolation layer may also have holes or slots to allow the passage of wires or connectors for powering the resistive film heater.

The thermoforming system may include a temperature controller. One of the advantages of using the resistive film heaters for thermoforming is that they can provide precise and adjustable temperature control for the thermoplastic material. The temperature of the resistive film heaters can be regulated by varying the electric current or voltage applied to them. The temperature of the resistive film heaters can also be monitored by using sensors, such as thermocouples, infrared cameras, or pyrometers, which can measure the surface temperature of the heaters or the dies. By using a temperature controller, incorporating for example a feedback loop or a programmable logic controller, the temperature of the resistive film heaters can be adjusted in real time to achieve the optimal heating conditions for the thermoforming process. The temperature control system can also prevent overheating or underheating of the thermoplastic material, which can affect the quality and performance of the final product. The temperature control system can also enable different heating profiles for different regions of the thermoplastic material, depending on the thickness, shape, or material properties of the preform. The temperature control system can thus enhance the flexibility and efficiency of the thermoforming method using the resistive film heaters.

The thermoforming system may include a power source. One exemplary power source for the thermoforming system is a direct current (DC) power supply. The power supply can also be regulated by the temperature controller, which can vary the electric current or voltage applied to the resistive film heaters according to the desired heating profile and feedback from the sensors. A DC power supply can provide a steady and constant electric current to the resistive film heaters, which can generate heat by the Joule effect. A DC power supply can offer advantages such as high efficiency, low noise, and easy control for the thermoforming system. Alternatively, an alternating current (AC) power supply can also be used.

Figure 5:
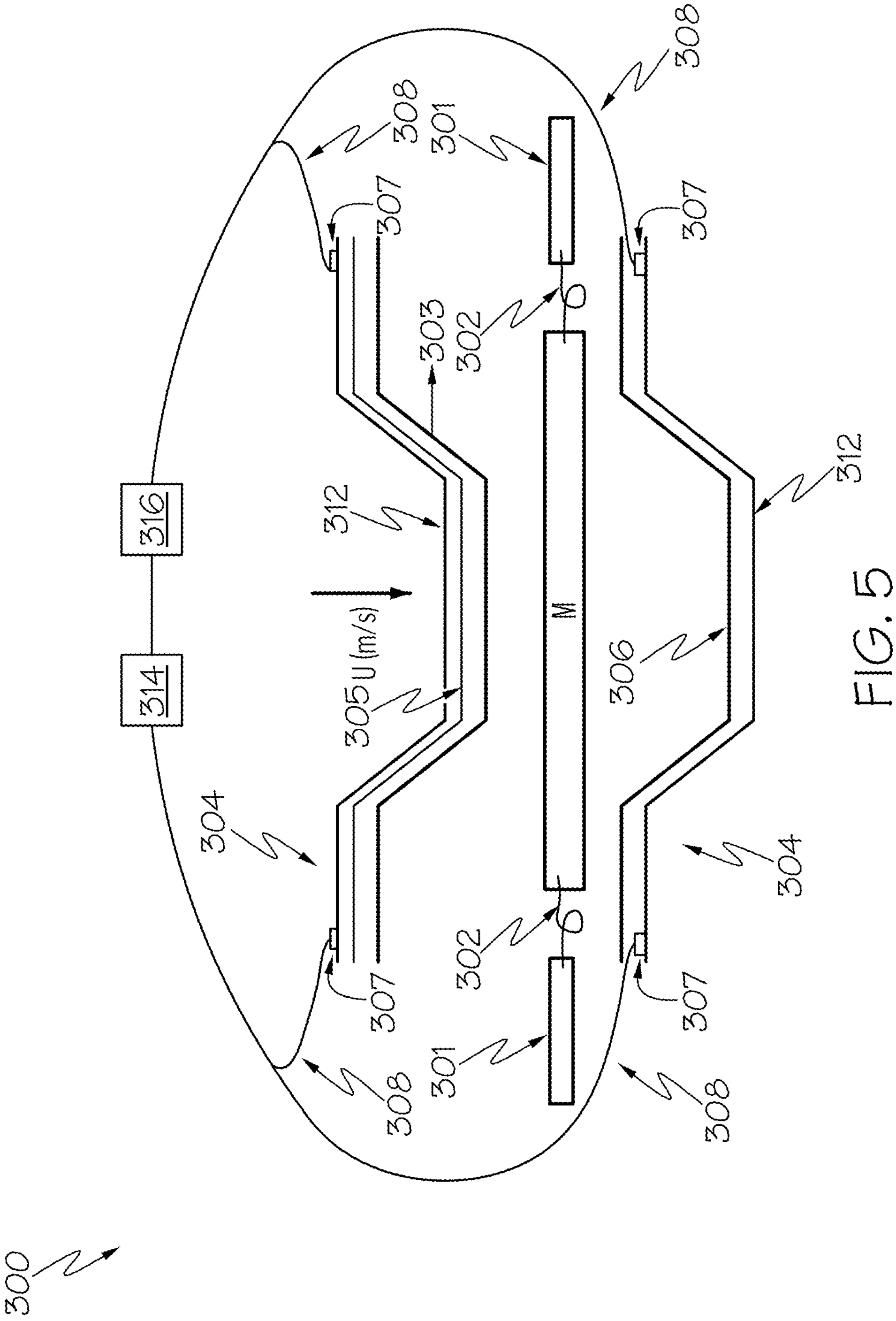
FIG. 5 illustrates a thermoforming system of the present description with male and female dies equipped with resistive film heaters for shaping thermoplastic materials.

FIG. 5 illustrates an exemplary thermoforming system for shaping a thermoplastic material. Thermoforming is typically used for manufacturing of polymeric materials, such as unfilled polymers, filled or particle-charged polymers (e.g. carbon black doped), short-fiber reinforced or continuous fiber reinforced composites. This process is suitable for rapid manufacturing of parts or components in high volume and complex shapes. Thermoforming typically includes two steps, where a preform or blank is firstly heated up to a temperature where it will be sufficiently softened, and quickly transferred into matched dies to form the polymeric material preform into its final shape. Thermoforming is widely used for rapid manufacturing of thermoplastic-based polymeric materials dedicated for aerospace, automotive, and packaging applications. Thermoforming of fiber-reinforced composites is also called as “stamp-forming.” The stamping tool typically includes a metal die and a rubber die where the rubber tool can be used on either male or female tool to provide a homogeneous pressure application. Both the sides of the stamping dies are typically preheated by heat-generating metallic resistors up to a temperature related the type of forming (for example, in an isothermal stamp-forming process, stamping dies are preheated to the temperature of a preform). Heating of molding tools with metallic resistors may require large amount of energy and time. The required energy and time to reach a desired temperature on a forming mold surface may be reduced by replacing metallic resistors with carbonaceous film heaters where such film heaters may be attached on the mold surfaces to heat the mold via conduction. Such heating method may also eliminate heating all the molding tool body, instead, it may only target heating the mold surface which can reduce the required energy input to reach a desired temperature on mold surface.

The present description facilitates the potential of replacing metallic resistors with resistive film heaters, which can be formed into complex shapes prior to use as heating hardware for stamping dies. Such a flexible film heater can be adjusted to any geometry depending on the shape and size requirements of stamping dies, and thus can be placed on the surfaces of dies. Similarly, the resistive heating system presented here may include resistive film heaters made of a blend of polymer/lignin-based graphite or graphene flakes which would make such film heaters adaptable to any geometry of stamping dies. This can extend the applicability of the proposed heating method for thermoforming of various type of polymeric materials in aerospace, automotive and packaging industries.

In addition, usage of lignin-based self-standing flexible resistive film heaters for thermoforming may facilitate more effective and robust control of heating and cooling rates of a formed product. Precise thermal management including highly adjustable heating and cooling rate on the mold surface may be crucial for thermoforming of thermoplastic-based polymeric materials. For example, aerospace-grade thermoplastics are usually semi-crystalline where the level of crystallinity is highly dependent on cooling rate so that precise thermal management will likely have a great impact on the mechanical and physical properties of thermoformed final products.

FIG. 5 depicts an exemplary thermoforming system 300 which can be adopted for a method for thermoforming of a thermoplastic material M. The figure illustrates the forming stage of the thermoforming method, which is performed immediately after a heating stage. The geometry of the mold depicted in FIG. 5 can be typically adapted for thermoforming of thermoplastic composite airframe structures (for example, omega-shaped airframe stiffeners), and thermoplastic composite primary vehicle structures (for example, vehicle B-pillar), used in aerospace and automotive applications, respectively. As illustrated in FIG. 5, the proposed system 300 incorporates a flat preform made of a thermoplastic material M (for example a fiber-reinforced composite) attached to a blank holder 301, typically including a metallic blank holder, such as a metallic spring 302. The male die or tool 303 is typically made of a metallic material. The surface of the male die or tool 303 is heated using a resistive film heater 304 that includes a resistive heating layer 312 formed of lignin-based graphite or graphene. The resistive heating layer 312 may be made of a blend of polymer/lignin-based graphite or graphene flakes (for example, a blend of lignin-based graphene/PVA) in order to increase flexibility of the film heater for adjusting it to any geometry depending on the shape and size requirements of stamping dies. The weight ratio of polymer/graphene or graphite flakes of the resistive film heater 304 may be, for example, in a range of 1:1 to 1:10, in order to provide enough flexibility, but also maintain a sufficiently high electrical and thermal conductivity in the resistive film heater 304, which is required for effective electrothermal heating. However, the selected weight ratio of polymer/graphene or graphite flakes of the resistive film heater 304 may be affected by the type of polymer to be used. An electrical isolation layer 305 is placed between the male die or tool 303 and the resistive film heater 304. The electrical isolation layer 305 is used to prevent electric current flow from the resistive film heater 304 through the metallic male die or tool 303, as they are both electrically conductive. Both the electrical isolation layer 305 and the resistive film heater 304 may be bonded to the male die or tool 303 using an adhesive paste (for example, an epoxy-based adhesive). The female die or tool 306 is typically made of rubber where the female die or tool 306 can also be heated using a lignin-based graphite or graphene resistive film heater 304. Similarly, the resistive film heater 304 may be bonded to female die or tool 306 using an adhesive paste (for example, an epoxy-based adhesive). The maximum operating temperature of such adhesive may be evaluated to prior to the application of the proposed heating method. A direct current (DC) power source is connected to the resistive film heaters 304 using electric cables or wires 308 and electrical terminals 307, which are attached on both the ends of each resistive film heater 304. Electrical terminals 307 may be made of copper (for example, a copper mesh). In case of a high electric contact resistance between the electrical terminals 307 and the resistive film heaters 304, a conductive adhesive (for example, a conductive silver adhesive) may be applied between the resistive film heaters 304 and the electrical terminals 307.

Another aspect of the disclosed method for thermoforming is to use a power source 314 and a temperature controller 316 to regulate the heating process of the resistive film heater. The power source 314 may be a direct current power supply that provides a constant or variable current and voltage to the resistive film heater. The temperature controller 316 may be a device that monitors the temperature of the die and the resistive film heater using sensors, such as thermocouples, and adjusts the current and voltage of the power source 314 accordingly to achieve a desired heating temperature and rate. The power source 314 and the temperature controller 316 may be connected to the resistive film heater 304 using electric cables or wires 308 and electrical terminals 307. The power source 314 and the temperature controller 316 may also be integrated into a single unit or system. The use of the power source 314 and the temperature controller 316 can enable a precise and efficient heating of the die and the thermoplastic material.

Figure 6:
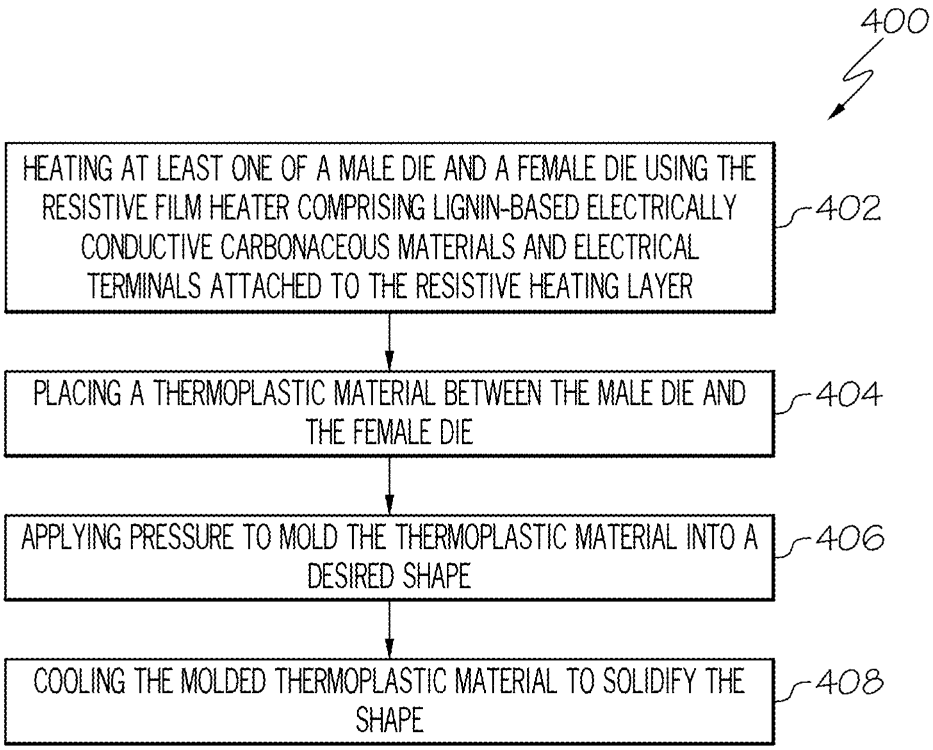
FIG. 6 represents a flow diagram for a thermoforming method of the present description.

As illustrated in FIG. 6, the present description also pertains to a method for thermoforming. The method may include heating 402 at least one of a male die and a female die using the resistive film heater comprising lignin-based electrically conductive carbonaceous materials and electrical terminals attached to the resistive heating layer for supplying electrical current therethrough; placing 404 a thermoplastic material between the male die and the female die; applying 406 pressure to mold the thermoplastic material into a desired shape; and cooling 408 the molded thermoplastic material to solidify the shape. The method may further include preheating the thermoplastic material before placing the thermoplastic material between the male die and the female die.

One aspect of the disclosed method for thermoforming is to heat at least one of a male die and a female die using the resistive film heater comprising lignin-based electrically conductive carbonaceous materials. The resistive film heater is attached to the surface of the die and connected to a direct current power source through electrical terminals. By supplying electrical current to the resistive film heater, Joule heating is generated and transferred to the die. The heating temperature and rate can be controlled by adjusting the current and voltage of the power source. The heating of the die can facilitate the molding of the thermoplastic material into a desired shape with reduced defects and improved properties.

Another aspect of the disclosed method for thermoforming is to place a thermoplastic material between the male die and the female die. The thermoplastic material may be a flat preform made of polymeric materials, such as a fiber-reinforced composite, attached to a blank holder. The thermoplastic material may be preheated before placing it between the dies to soften it and make it more pliable. The preheating may be done by a conventional oven, an infrared heater, or another resistive film heater attached to the blank holder. The placement of the thermoplastic material between the dies may be done manually or automatically by a robotic arm or a conveyor belt.

A further aspect of the disclosed method for thermoforming is to apply pressure to mold the thermoplastic material into a desired shape. The pressure may be applied by closing the male die and the female die to form a cavity with the thermoplastic material inside. The cavity may have a shape that corresponds to the final product, such as a car part, a container, or a medical device. The pressure may be applied by a hydraulic or pneumatic system that controls the movement and force of the dies. The pressure may vary depending on the thickness, stiffness, and temperature of the thermoplastic material. The pressure may help to conform the thermoplastic material to the shape of the cavity and eliminate air bubbles and wrinkles.

Another aspect of the disclosed method for thermoforming is to cool the molded thermoplastic material to solidify the shape. The cooling may be done by removing the electrical current from the resistive film heater attached to the die, thereby reducing the temperature of the die and the thermoplastic material. The cooling may also be done by applying a cooling fluid, such as water or air, to the surface of the die or the thermoplastic material. The cooling fluid may have a lower temperature than the thermoplastic material and may circulate through channels or pipes in the die or the blank holder. The cooling may help to reduce the residual stress and shrinkage of the thermoplastic material and enhance the dimensional stability and mechanical properties of the final product.

Figure 7:
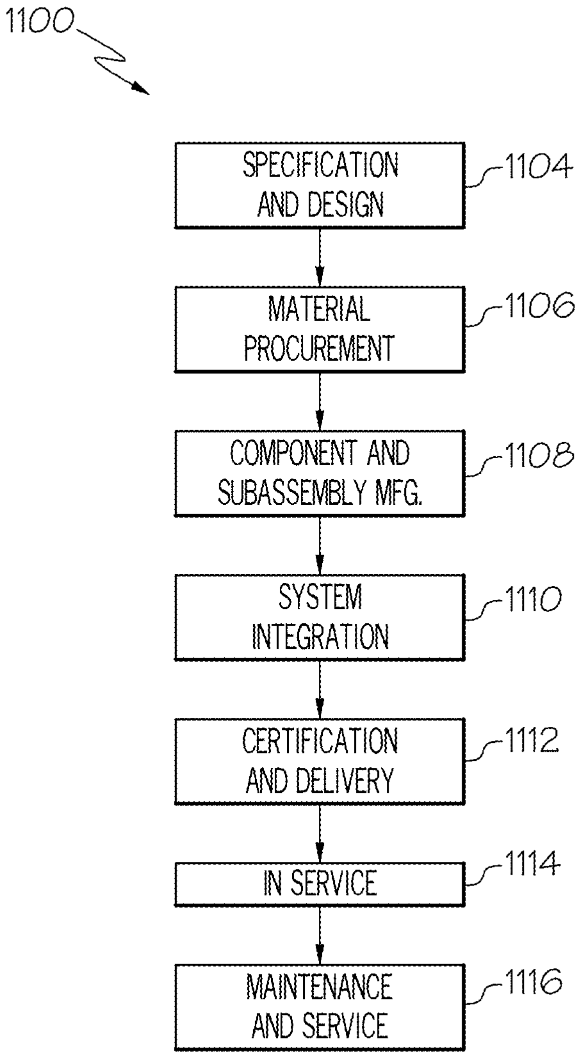
FIG. 7 is a block diagram of aircraft production and service methodology.
Figure 8:
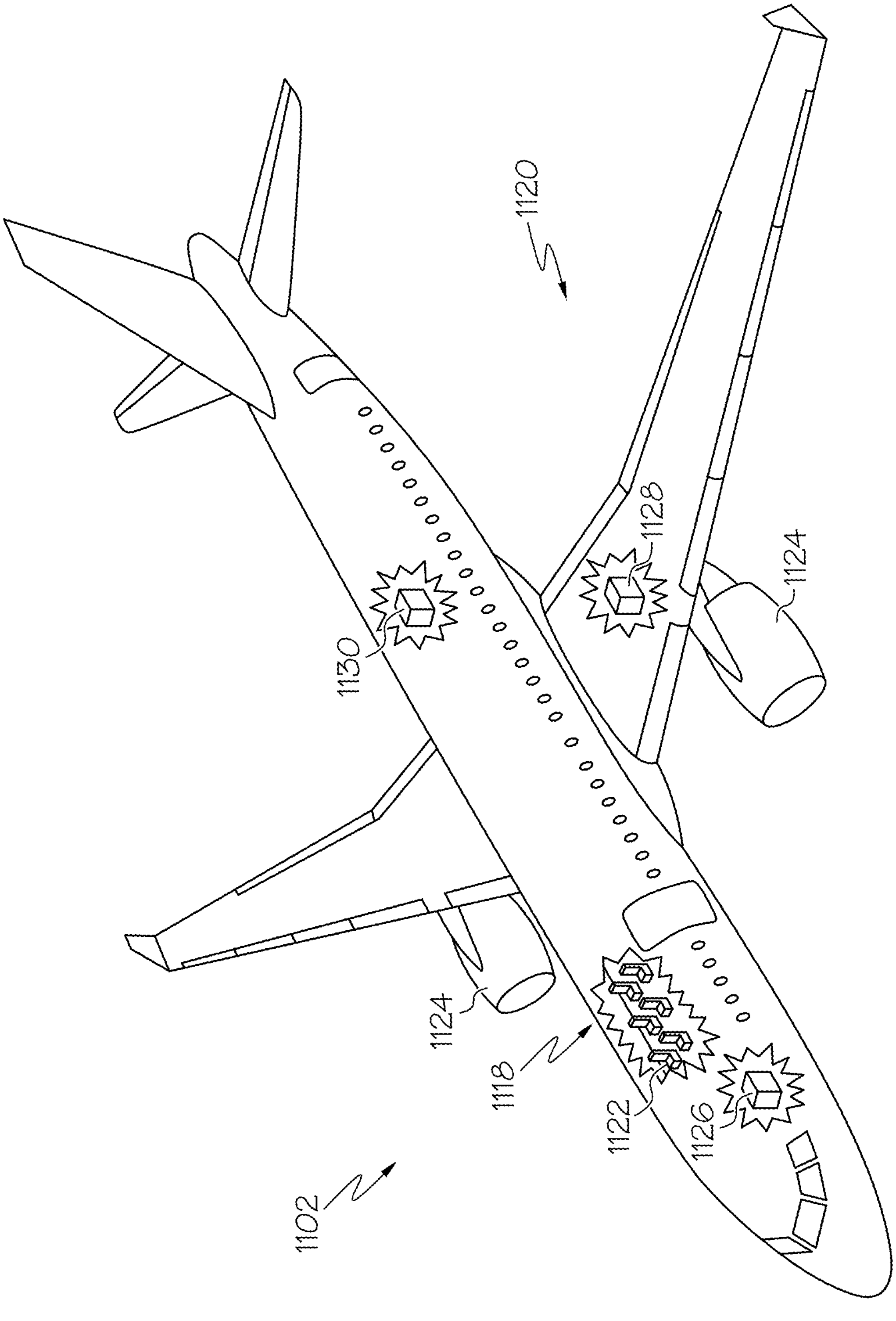
FIG. 8 is a schematic illustration of an aircraft.

Examples of the subject matter disclosed herein may be described in the context of aircraft manufacturing and service method 1100 as shown in FIG. 7 and aircraft 1102 as shown in FIG. 8. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 8, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus (es), method(s), or combination thereof may be utilized during production stages (block 1108 and block 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Although various embodiments of the disclosed resistive film heaters, composite material processing apparatus and methods, and thermoforming systems and methods have been shown and described, modifications may occur to those skilled in the art upon reading the specification. The present application includes such modifications and is limited only by the scope of the claims.

What is claimed is:

1. A resistive film heater, comprising:

a resistive heating layer comprising lignin-based electrically conductive carbonaceous materials having a flake morphology, wherein the flakes of the lignin-based electrically conductive carbonaceous materials have an average area, as viewed perpendicular to a major face of the flakes, of at least 10 $\mu m^2$; and electrical terminals attached to the resistive heating layer for supplying electrical current therethrough.

2. The resistive film heater of claim 1, wherein the flakes of lignin-based electrically conductive carbonaceous materials have an average area, as viewed perpendicular to a major face of the flakes, of at least 100 $\mu m^2$.

3. The resistive film heater of claim 1, wherein the resistive heating layer further comprises a polymer matrix.

4. The resistive film heater of claim 3, wherein a weight ratio of polymer matrix to the lignin-based electrically conductive carbonaceous materials is in a range of 1:1 to 1:10.

5. The resistive film heater of claim 1, wherein the electrical terminals are comprised of at least one of copper, copper alloy, aluminum, and aluminum alloy.

6. The resistive film heater of claim 1, further comprising a substrate upon which the resistive heating layer is disposed.

7. The resistive film heater of claim 1, further comprising power supply connected to the electrical terminals.

8. The resistive film heater of claim 1, further comprising a temperature controller connected to the electrical terminals.

9. The resistive film heater of claim 1, wherein the lignin-based electrically conductive carbonaceous materials are in the form of a self-standing film of lignin-based electrically conductive carbonaceous materials.

10. The resistive film heater of claim 1, wherein the lignin-based electrically conductive carbonaceous materials have an electrical conductivity exceeding $10^2$ S/m.

11. A composite material processing apparatus comprising:

a resistive film heater for providing heat to a composite material, the resistive film heater comprising a resistive heating layer comprising lignin-based electrically conductive carbonaceous materials having a flake morphology and electrical terminals attached to the resistive heating layer, wherein the flakes of the lignin-based electrically conductive carbonaceous materials have an average area, as viewed perpendicular to a major face of the flakes, of at least 10 $\mu m^2$;

a vacuum bag for encasing the composite material and the resistive film heater and for maintaining a vacuum environment therein; and an electrical interface for supplying electrical current through the electrical terminals of the resistive film heater.

12. The composite material processing apparatus of claim 11, further comprising a breather material positioned adjacent to the composite material.

13. The composite material processing apparatus of claim 12, further comprising a perforated film positioned between the composite material and the breather material.

14. The composite material processing apparatus of claim 11, further comprising an electrical isolation layer between the composite material and the resistive film heater.

15. The composite material processing apparatus of claim 11, further comprising a thermal isolation material adjacent to the resistive film heater on a side opposite of the composite material.

16. The composite material processing apparatus of claim 11, further comprising power supply connected to the electrical terminals.

17. The composite material processing apparatus of claim 11, further comprising a temperature controller connected to the electrical terminals.

18. A method for processing a composite material using the composite material processing apparatus of claim 11, the method comprising:

encasing the composite material and the resistive film heater within the vacuum bag;

evacuating air from the vacuum bag to form a vacuum environment around the composite material and the resistive film heater; and passing an electrical current through the electrical interface to the electrical terminals of the resistive film heater to heat the composite material.

19. A thermoforming system for shaping a thermoplastic material, comprising:

a male die and a female die, at least one of which is equipped with a resistive film heater for heating of a surface thereof, the resistive film heater comprising a resistive heating layer comprising lignin-based electrically conductive carbonaceous materials having a flake morphology, and electrical terminals attached to the resistive heating layer, wherein the flakes of the lignin-based electrically conductive carbonaceous materials have an average area, as viewed perpendicular to a major face of the flakes, of at least 10 $\mu m^2$; and a power source connected to the electrical terminals attached to the resistive heating layer.

20. The resistive film heater of claim 1, wherein the lignin-based electrically conductive carbonaceous materials have an electrical conductivity exceeding $10^4$ S/m.

* * * * *